United States Patent
Kim et al.

(10) Patent No.: US 8,515,944 B2
(45) Date of Patent: Aug. 20, 2013

(54) SENSOR NETWORK MANAGING APPARATUS AND METHOD THEREOF

(75) Inventors: Min Soo Kim, Daejeon (KR); Chung-ho Lee, Daejeon (KR); Yong Joon Lee, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 456 days.

(21) Appl. No.: 12/745,076

(22) PCT Filed: Aug. 21, 2008

(86) PCT No.: PCT/KR2008/004884
§ 371 (c)(1),
(2), (4) Date: May 27, 2010

(87) PCT Pub. No.: WO2009/069882
PCT Pub. Date: Jun. 4, 2009

(65) Prior Publication Data
US 2010/0306189 A1    Dec. 2, 2010

(30) Foreign Application Priority Data
Nov. 29, 2007 (KR) .................. 10-2007-0122888

(51) Int. Cl.
  G06F 7/00    (2006.01)
  G06F 17/30   (2006.01)
(52) U.S. Cl.
  USPC ........... 707/714; 707/718; 707/743; 707/918; 707/944
(58) Field of Classification Search
  None
  See application file for complete search history.

(56) References Cited

U.S. PATENT DOCUMENTS 6,732,107 B1 *  5/2004  Luo et al. .............................. 1/1
6,745,198 B1 *  6/2004  Luo et al. .............................. 1/1

(Continued)

FOREIGN PATENT DOCUMENTS

| JP | 2006-195788 | 7/2006 |
| KR | 10-2006-0070165 | 6/2006 |

(Continued)

OTHER PUBLICATIONS

International Search Report for PCT/KR2008/004884, mailed Feb. 23, 2009.

(Continued)

*Primary Examiner* — Robert Beausoliel, Jr.
*Assistant Examiner* — Susan F Rayyan
(74) *Attorney, Agent, or Firm* — Staas & Halsey LLP

(57) ABSTRACT

The present invention relates to a sensor network managing apparatus and a method thereof. The sensor network managing apparatus according to the present invention receives a query that includes a spatial join predicate for searching for target sensor nodes and a comparison predicate that is different for each sensor network, and generates query execution order information for searching for the target sensor nodes based on the spatial join predicate and the comparison predicate, wherein the spatial join predicate is related to a spatial location between sensor nodes respectively included in different sensor networks, and the comparison predicate are related to sensing values of sensor nodes of the sensor networks. In addition, the sensor node managing apparatus executes queries for the spatial join predicate and the comparison predicate on the plurality of sensor nodes on the basis of determined query execution order, and then extracts target sensor nodes as the query results. According to the present invention, an efficient method for searching for user-desired sensor nodes in more than two different sensor networks can be provided.

7 Claims, 5 Drawing Sheets

(56) References Cited

U.S. PATENT DOCUMENTS

| | | | |
|---|---|---|---|
| 7,386,561 B1* | 6/2008 | Ramesh et al. | 1/1 |
| 7,555,412 B2* | 6/2009 | Nath et al. | 702/188 |
| 7,590,098 B2* | 9/2009 | Ganesh | 370/338 |
| 7,873,673 B2* | 1/2011 | Cleveland et al. | 707/802 |
| 7,945,569 B2* | 5/2011 | Drory et al. | 707/743 |
| 8,140,658 B1* | 3/2012 | Gelvin et al. | 709/224 |
| 2005/0055417 A1* | 3/2005 | Reich et al. | 709/208 |
| 2005/0222978 A1* | 10/2005 | Drory et al. | 707/3 |
| 2006/0161645 A1* | 7/2006 | Moriwaki et al. | 709/223 |
| 2006/0190458 A1* | 8/2006 | Mishina et al. | 707/10 |
| 2007/0050340 A1* | 3/2007 | von Kaenel et al. | 707/3 |
| 2008/0052041 A1* | 2/2008 | Misra et al. | 702/182 |
| 2008/0215609 A1* | 9/2008 | Cleveland et al. | 707/102 |
| 2009/0083219 A1* | 3/2009 | Zane et al. | 707/2 |
| 2009/0276525 A1 | 11/2009 | Jo et al. | |
| 2010/0161630 A1* | 6/2010 | Moriwaki et al. | 707/758 |

FOREIGN PATENT DOCUMENTS

| | | |
|---|---|---|
| KR | 10-2006-0079770 | 7/2006 |
| KR | 10-0707671 | 4/2007 |
| KR | 10-2007-0061112 | 6/2007 |
| KR | 10-0817025 | 3/2008 |

OTHER PUBLICATIONS

Murat Demirbas et al., "Peer-to-Peer Spatial Queries in Sensor Networks", Proceedings of the Third International Conference on Peer-to-Peer Computing 2003.

Man Lung Yiu et al., "Retrieval of Spatial Join Pattern Instances from Sensor Networks", SSDBM07, Jul. 9, 2007.

Amir Soheili et al., "Spatial Queries in Sensor Networks", ACM GIS'05, Nov. 4, 2005.

* cited by examiner

US 8,515,944 B2

SENSOR NETWORK MANAGING APPARATUS AND METHOD THEREOF

CROSS REFERENCE TO RELATED APPLICATIONS

This application claims the benefit under 35 U.S.C. Section 371, of PCT International Application No. PCT/KR2008/004884, filed Aug. 21, 2008, which claimed priority to Korean Application No. 10-2007-0122888, filed Nov. 29, 2007, the disclosures of which are hereby incorporated by reference.

TECHNICAL FIELD

The present invention relates to a sensor network managing apparatus and a management method thereof. Particularly, it relates to a sensor network managing apparatus and a method thereof that can provide an efficient method for searching manager-desired sensors in more than two different sensor networks.

The present invention was supported by the IT R&D program of MIC/IITA [2006-S-022-02, Development of USN Middleware Platform Technology].

BACKGROUND ART

Recently, spatial search technology in a sensor network environment where a sensor network database and a spatial information database are converged has been actively researched.

The spatial search technology in the sensor network environment is used for searching for user-desired sensor nodes by using a spatial area in the case of searching for the user-desired sensor nodes from a plurality of sensor nodes in the sensor network. Such a spatial search technology has a merit of promptly searching for the user-desired sensor nodes while minimizing power consumption of sensor nodes when all the sensor nodes know their location information (x, y) and a user wants to search for sensor nodes contained in specific spatial areas (x1, y1, x2, and y2).

A distributed spatial index (DSI) method that is shown in FIG. 1 and FIG. 2 is a conventionally representative spatial search technology in a sensor network environment.

FIG. 1 and FIG. 2 are block diagrams of a conventional DSI method in a sensor network environment.

As shown in FIG. 1 and FIG. 2, according to the conventional distributed spatial search method in the sensor network environment, each node stores identifiers (IDs) of its child nodes and a minimum bounding rectangle (MBR) that contains all child nodes. Therefore, when a search area R is given as shown in FIG. 1, the sink node 0 10 compares MBRs A, B, and C of its child nodes 1, 2, and 3 (20, 40, and 30 of FIG. 1) with the search area R before transmitting messages to the child nodes 1 20, 2 40, and 3 30 and the search area R is transmitted only to the child node 3 30 that has an intersection with the R. Such a distributed spatial search method has a merit of reducing power consumption of sensor nodes in visiting its child nodes by filtering out the child node 1 (20) and the child node 2 40 in advance.

The conventional distributed spatial index method can be efficiently used for spatial searching for sensor nodes in a signal sensor network, but, in a heterogeneous sensor networks environment where more than two different sensor networks exist, it cannot provide an answer for a spatial join query that inquires a spatial relationship related to a location between sensor nodes, each of which is included in a different sensor network.

DISCLOSURE

Technical Problem

The present invention has been made in an effort to provide a sensor network managing apparatus and a method thereof having advantage of efficiently searching for user-desired sensor nodes in different sensor networks.

Technical Solution

An exemplary sensor node managing apparatus according to an embodiment of the present invention is connected to more than two different sensor networks, each including a plurality of sensor nodes, and exchanges data with each of the sensor networks.

The sensor node managing apparatus includes: a query optimization unit receiving a query that includes a spatial join predicate for searching for target sensor nodes and a comparison predicate that is different for each sensor network, and generating query execution order for searching for the target sensor nodes based on the received query, wherein the spatial join predicate is related to a spatial location between the sensor nodes respectively included in different sensor networks, and wherein the comparison predicate is related to sensing values of sensor nodes of the respective sensor networks; and a query execution unit executing the spatial join predicate and the comparison predicate on the more than two different sensor networks based on the query execution order received from the query optimization unit, and extracting the target sensor nodes by using a result of the execution.

The sensor node managing apparatus further includes a spatial index unit storing location information of sensor nodes respectively included in the more than two sensor networks, and the query execution unit extracts sensor nodes that correspond to the spatial join predicate based on the location information stored in the spatial index unit.

An exemplary sensor node managing method according to an embodiment of the present invention manages more than two different sensor networks, each including a plurality of sensor nodes.

The sensor node managing method includes: receiving a query that includes a spatial join predicate for searching target sensor nodes and a comparison predicate that is different for each sensor network, wherein the spatial join predicate is related to a spatial location between the sensor nodes, each included in a different sensor network, and wherein the comparison predicate is related to sensing values of the sensor nodes in each sensor network; determining query execution order for searching target sensor nodes respectively included in the more than two different sensor networks on the basis of the spatial join predicate and the comparison predicate; executing a query of the spatial join predicate and the comparison predicate for the plurality of sensor nodes on the basis of the determined query execution order; and extracting the target sensor nodes as a query result of the executing of the query.

Here, the determining of the query execution order includes: determining whether selectivity information corresponding to the spatial join predicate and the comparison predicate is included in previous selectivity information of sensor nodes selected by a previous spatial join predicate and a previous comparison predicate that have been previously stored; and determining query execution order for searching for target sensor nodes of the more than two different sensor networks on the basis of the corresponding selectivity information if the corresponding selectivity information exists.

Advantageous Effects

According to the present invention, sensor nodes in an area where user-requested predicates can be satisfied can be efficiently searched in different sensor networks.

In addition, when a user requests various predicates, a precise location of a desired sensor can be detected while satisfying the user's predicates and minimizing power consumption of the entire sensor nodes (sensor nodes in different sensor networks).

MODE FOR INVENTION

Figure 1:
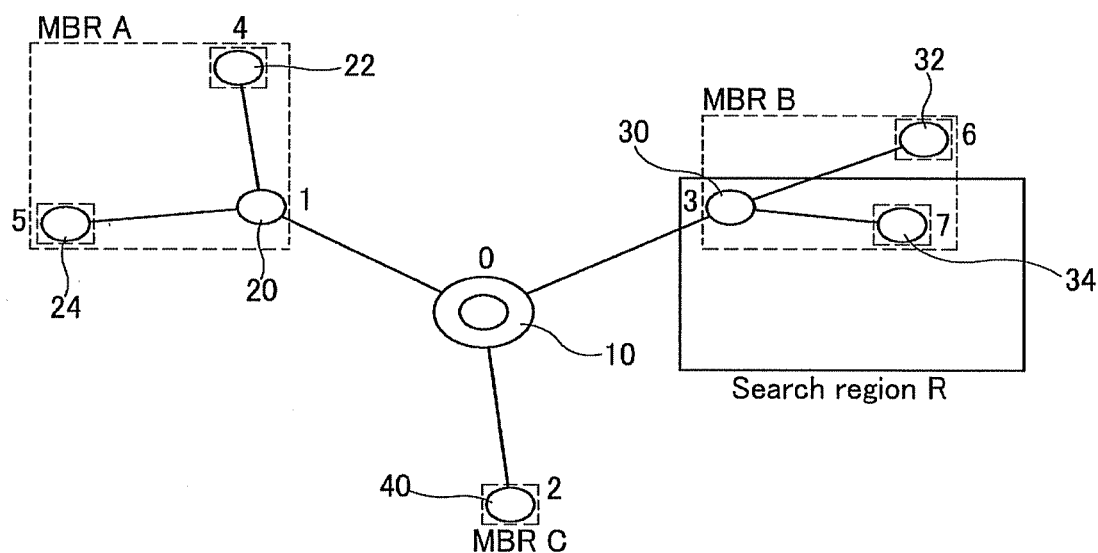
FIG. 1 and FIG. 2 are block diagrams of a conventional distributed spatial index method in a sensor network environment.
Figure 1:
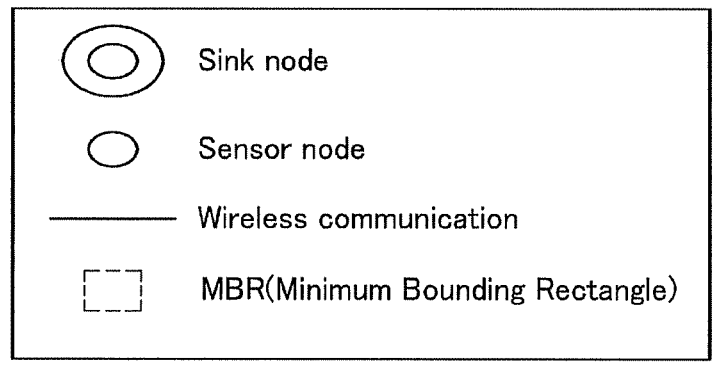
Figure 2:
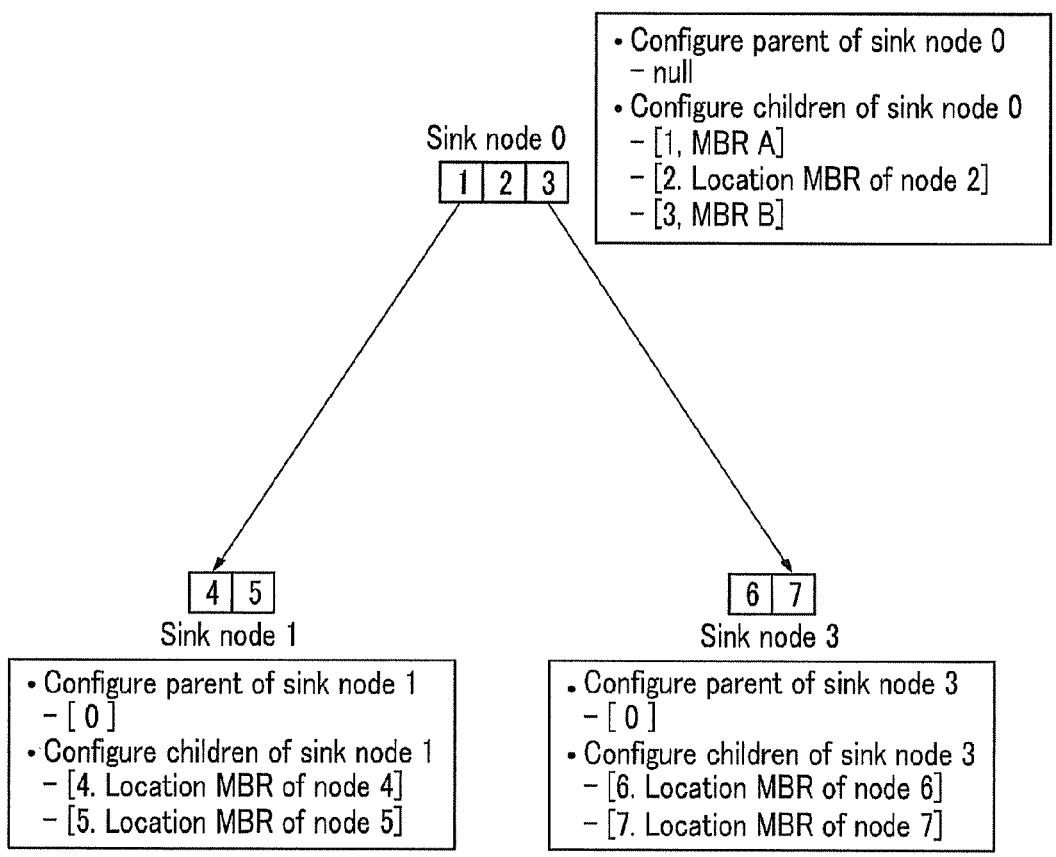

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

A sensor network managing apparatus and a management method thereof according to an exemplary embodiment of the present invention will be described in further detail with reference to the drawings.

Figure 3:
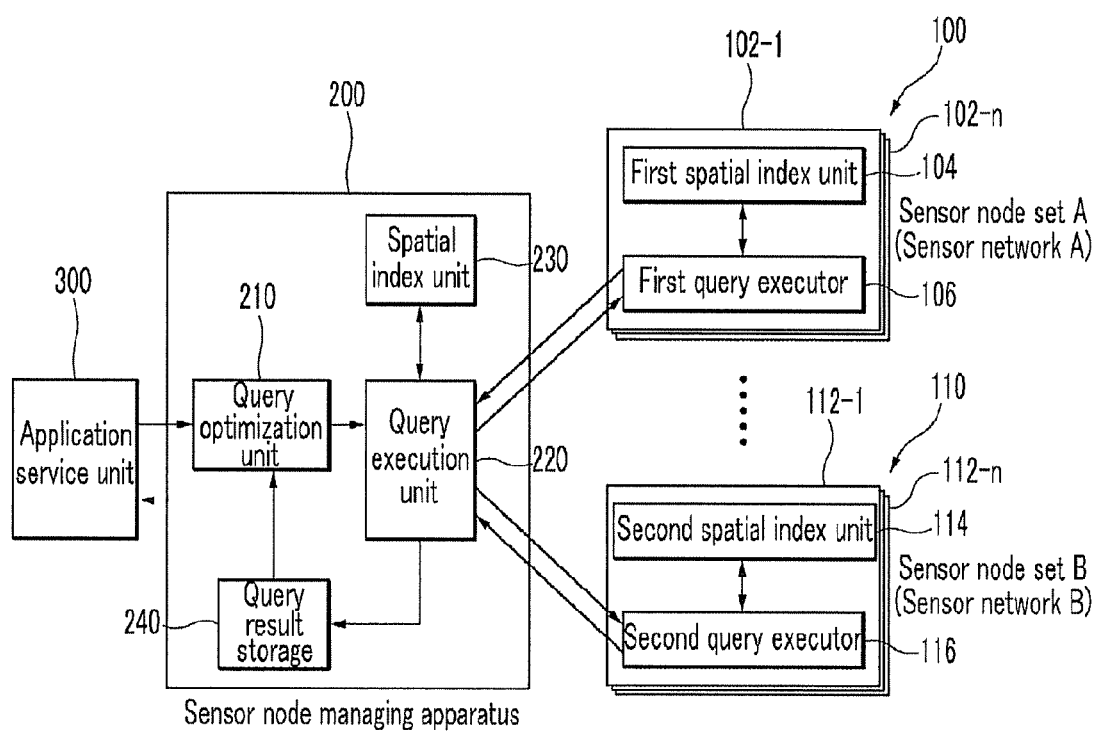
FIG. 3 is a block diagram of a system to which a sensor network managing apparatus according to an exemplary embodiment of the present invention is applied.

FIG. 3 is a block diagram of a system having a sensor network managing apparatus according to an exemplary embodiment of the present invention.

As shown in FIG. 3, the system according to the exemplary embodiment of the present invention includes an application service unit 300, a sensor node manager 200, and a plurality of sensor networks (hereinafter referred to as "sensor node sets") 100 and 110.

The application service unit 300 receives a specific query for searching for target sensor nodes from a user and transmits the received query to the sensor node manager 200, and receives a response corresponding to the query from the sensor node manager 200 and provides the response to the user.

The sensor node manager 200 includes a query optimization unit 210, a query execution unit 220, a spatial index unit 230, and a query result storage unit 240.

The query optimization unit 210 analyzes a users query received from the application service unit 300, and creates a query execution plan by using a previous query execution plan, if the query result storage unit 240 has the previous query execution plan.

In addition, the query optimization unit 210 transmits the created query execution plan to the query execution unit 220.

For example, when receiving a query of "search pairs of sensor nodes that have humidity of over 60% within 10 meters in radius of sensor nodes that have a harmful gas concentration level of over 5%" from two sensor networks, the query optimization unit 210 selects a sensor network A that measures a harmful gas concentration level and a sensor network B that measures humidity, and sets comparison predicates P1 and P2 for the sensor networks A and S, respectively. The comparison predicate P1 is set to be greater than 5%, and the comparison predicate P2 is set to be greater than 60%. In addition, the query optimization unit 210 creates a spatial join predicate (S) of "a distance between sensor nodes over heterogeneous sensor networks is within 10 m," and then determines query execution order (i.e., S->P1->P2) for the respective sensor networks. In this instance, the query execution order is determined on the basis of previous selectivity information when the previous selectivity information for the query already exists. Otherwise, the query execution order is randomly set.

The query execution plan includes the query execution order for the sensor networks 100 and 110 and comparison predicates and a spatial join predicate for the sensor networks. Herein, the query execution order includes execution order of comparison predicates and selectivity information for the two sensor networks.

The query execution unit 220 performs query execution based on the query execution plan transmitted from the query optimization unit 210. At this time, the query execution unit 220 performs query execution in phases based on the query execution order.

In more detail, the query execution unit 220 initially extracts first candidate node pairs that satisfy the spatial join predicate (S) for all the sensor nodes of the sensor networks A 100 and B 110 by using spatial index information of the spatial index unit 230, and calculates a result of the comparison predicate P1 for the first candidate nodes of the sensor network A 100 on the basis of the query execution order (if the sensor network A is prior). The query execution unit 220 extracts a pair of second candidate nodes that satisfy spatial join predicate (S) from the calculated result of the sensor network A and candidate nodes of the sensor network B of the first candidate node pairs.

The query execution unit 220 asks the sensor network B 110 to calculate a result of the comparison predicate P2 from the second candidate node pairs.

In addition, the query execution unit 220 provides a result pair of a result of a sensor network A and a result of a sensor network B as a final result to the application service unit 300. The query execution unit 220 stores selectivity information for a query of each sensor network in the query result storage unit 240.

The spatial index unit 230 stores spatial index information that is based on location information of each node of the sensor network A 100 and the sensor network B 110, and provides the stored spatial index information to the query execution unit 220.

Each of the sensor networks A 100 and B 110 includes a plurality of sensor nodes 102-1 to 102-n and 112-1 to 112-n, and each sensor node has a parent-child relationship. In this instance, the sensor networks A 100 and B 110 are sensor nodes sets that have different kinds of sensors.

First, the sensor node 102-1 of the sensor network A 100 includes a first spatial index 104 and a first query executor 106.

The first spatial index 104 stores distributed spatial index information that includes location information of an upper sensor node and a lower sensor node.

The first query executor 106 receives comparison predicate (P1) from the query execution unit 220 of the sensor node manager 200, determines whether a current sensing value satisfies the corresponding comparison predicate (P1), and transmits a result of the determination to the query execution unit 220 of the sensor node manager 200.

In addition, the first query executor 106 receives spatial join predicate (S) from the query execution unit 220 of the sensor node manager 200, determines whether the sensor node satisfies the corresponding spatial join predicate S, and transmits a result of the determination to the query execution unit 220 of the sensor node manager 200. In this instance, if the sensor node is the topmost node (i.e., root node), the first query executor 106 receives information of sensor nodes that are included in the sensor network A 100 among the first candidate node pairs from the query execution unit 220 of the sensor node manager 200, and performs spatial search for the corresponding sensor nodes by using the distributed spatial index information of the first spatial index 104 and provides a result of the spatial search to the query execution unit 220.

The sensor node 112-1 of the sensor network B 110 includes a second spatial index 114 and a second query executor 116.

The second spatial index 114 stores distributed spatial index information that includes location information of an upper sensor node and a lower sensor node.

The second query executor 116 receives comparison predicate P2 from the query execution unit 220 of the sensor node manager 200, determines whether a current sensing value satisfies the corresponding comparison predicate P2, and transmits a result of the determination to the query execution unit 220 of the sensor node manager 200.

In addition, the second query executor 116 receives spatial join predicate S from the query execution unit 220 of the sensor node manager 200, determines whether the sensor node 112-2 satisfies the spatial join predicate S, and transmits a result of the determination to the query execution unit 220 of the sensor node manager 200. In this instance, the second query executor 116 receives information of sensor nodes that are included in the sensor network B 110 among the second candidate node pairs from the query execution unit 220 of the sensor node manager 200 when the sensor node is a root node, and performs spatial search for the corresponding sensor node by using the distributed spatial index information of the first spatial index 104 and provides a result of the spatial search to the query execution unit 220.

Such a sensor network managing apparatus has a merit of efficiently detecting a sensor node in an area that satisfies user-desired predicates in the heterogeneous sensor network environment. In addition, the sensor network managing apparatus has another merit of detecting an exact location of a sensor node while satisfying user-desired predicates with minimum power consumption of all sensor nodes (i.e., sensor nodes in the heterogeneous sensor network environment) when the user suggests various predicates.

Figure 4:
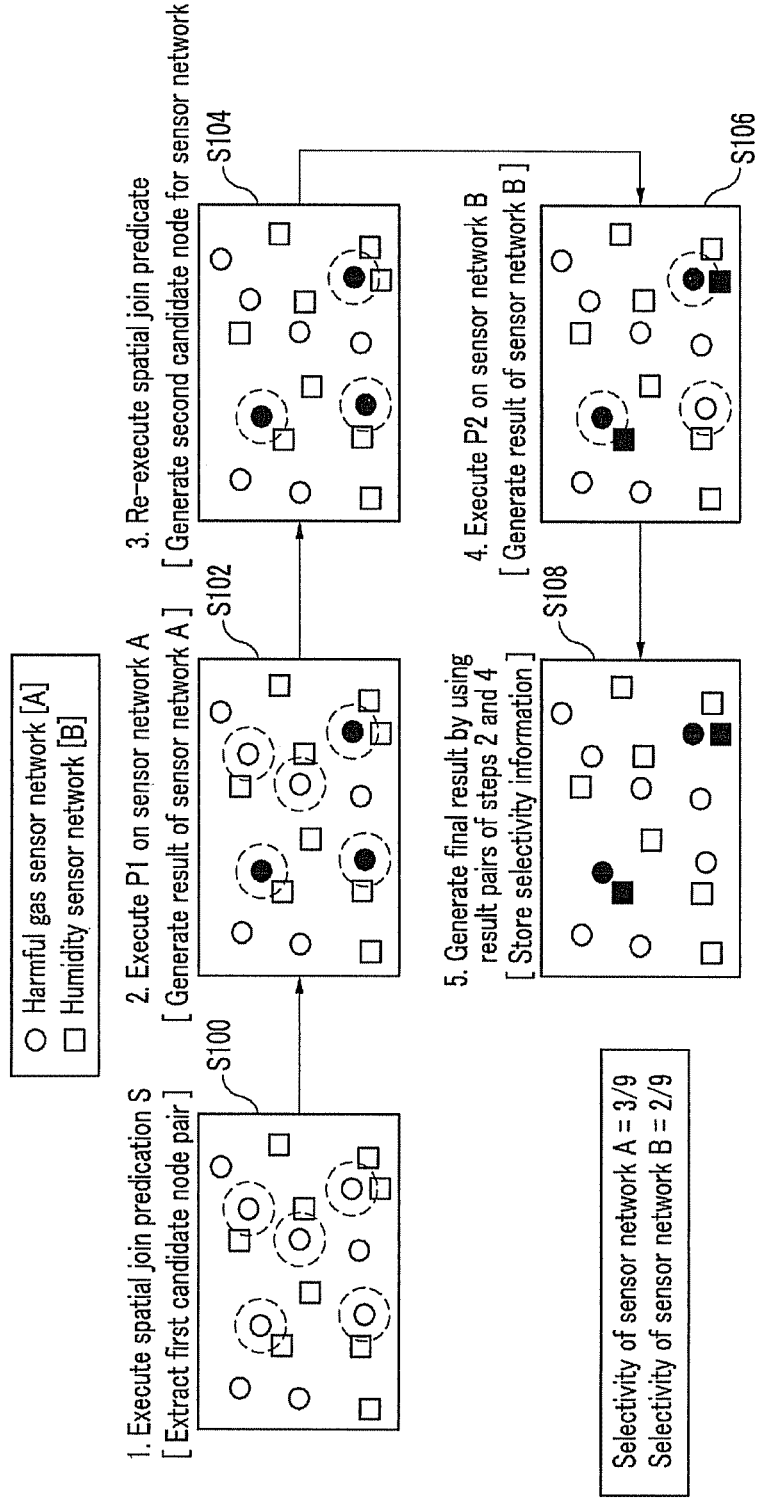
FIG. 4 is a flowchart of a sensor node searching process of a sensor node manager according to the exemplary embodiment of the present invention.

With reference to FIG. 4, a sensor node managing method of the sensor node managing apparatus according to the exemplary embodiment of the present invention will be described by using a harmful gas sensor network A and a humidity sensor network B.

FIG. 4 shows a sensor node searching process flowchart of the sensor node managing apparatus according to the exemplary embodiment of the present invention.

As shown in FIG. 4, the sensor node manager 200 according to the exemplary embodiment of the present invention executes comparison predicates P1 and P2 and spatial join predicate S given to sensing values of the sensor nodes 102-1 to 102-n and 112-1 to 112-n that exist in the sensor networks A and B 100 and 110 while minimizing power consumption of the entire sensor nodes in a network environment where two sensor networks (i.e., harmful gas sensor network A 100 and humidity sensor network B 110) are installed. Here, the comparison predicate P1 is that harmful gas concentration level is over 5%, the comparison predicate P2 is that humidity is over 60%, and the spatial join predicate S indicating a spatial relationship between locations of sensor nodes in the sensor network A and locations of sensor nodes in the sensor network B is that a distance between a sensor node in the sensor network A and a sensor node in the sensor network B is within 10 m.

First, the sensor node manager 200 extracts first candidates node pairs for the spatial join predicate S from all sensor nodes of the sensor networks A and B 100 and 110 (S100), and executes P1 on the sensor nodes of the first sensor network A 100 among the first candidate node pairs (S102). Then, the sensor node manager 200 re-performs the spatial join predicate S on a result of the P1 and the sensor nodes of the sensor network B 110 among the first candidate node pairs and extracts second candidate node pairs (S104).

The sensor node manager 200 executes P2 on the sensor nodes of the sensor network B 110 among the second candidate node pairs by using the second query executor 116 (S106), generates a final result by using the result of P1 in the step of S102 and a result of P2 in the step of S106, and then stores selectivity information (S108).

Here, the selectivity information indicates the number of sensor nodes that satisfies P1 or both P2 and S among the entire sensor nodes in each the sensor network, and the selectivity of the sensor network A is 3/9 based on a result of the comparison predicate P1 of the sensor network A and the selectivity of the sensor network B is 2/9 based on a result of the comparison predicate P2 of the sensor network B.

A sensor node searching process of the sensor node managing apparatus will now be described in further detail with reference to a sensor node managing method of FIG. 5.

Figure 5:
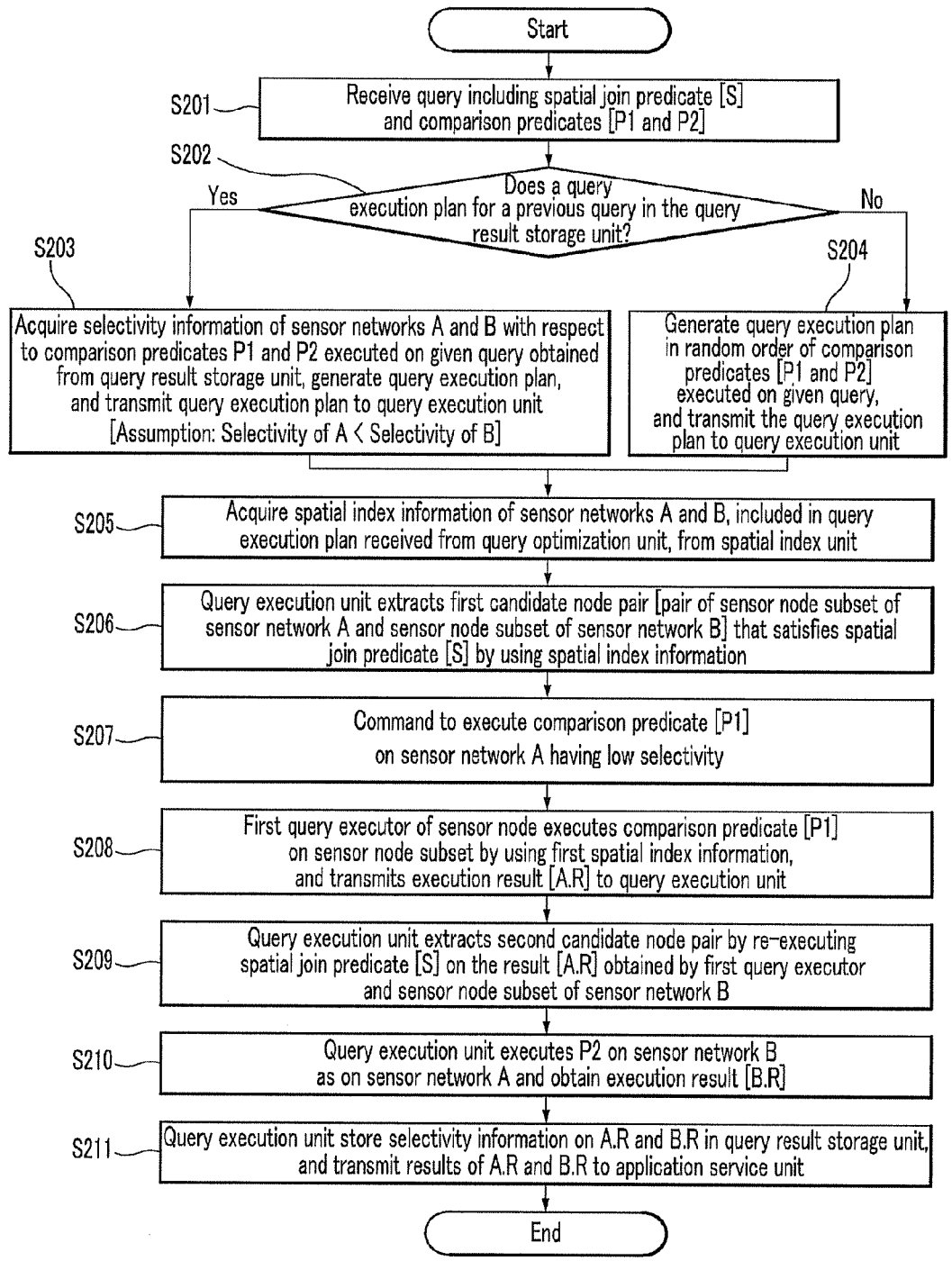
FIG. 5 is a flowchart of a sensor node managing method of the sensor node manager according to the exemplary embodiment of the present invention.

FIG. 5 is a flowchart of a sensor node managing method of the sensor node managing apparatus according to the exemplary embodiment of the present invention.

As shown in FIG. 5, the query optimization unit 210 of the sensor node manager 200 according to the exemplary embodiment of the present invention receives a query that includes spatial join predicate S and comparison predicates P1 and P2 from the application service unit 300 for searching for target sensor nodes (S201).

The query optimization unit 210 determines whether the query result storage unit 240 has a query execution plan for a previous query that is the same as the received query (S202).

In the step S202, when the a query execution plan for the previous query doesn't exist in the query result storage unit 240, the query optimization unit 210 generates new query execution plan by setting a random order in order to let a random-selected network among the sensor networks A 100 and B 110 to execute the comparison predicates P1 or P2 first. Then, the query optimization unit 210 transmits the generated query execution plan to the query execution unit 220 (S204).

However, in the step S202 when the query execution plan for the previous query exists in the query result storage unit 240, the query optimization unit 210 configures query execution plan by acquiring selectivity information for the sensor networks A 100 and B 110 with respect to the comparison predicates P1 and P2 from the query execution plan that is obtained from the query result storage unit 240, and transmits the query execution plan to the query execution unit 220 (S203). Hereinafter, it is assumed in the exemplary embodiment of the present invention that the selectivity of the sensor network A 100 is lower than the selectivity of the sensor network B 110.

The query execution unit 220 acquires spatial index information of the sensor networks A 100 and B 110 that is included in the received query execution plan from the spatial index unit 230 (S205), and extracts a first candidate node pair that satisfies the spatial join predicate by using the spatial index information (S206).

In addition, the query execution unit 220 commands sensor nodes that are included in the first candidate node pair of the sensor network A 100 that has low selectivity to execute the comparison predicate P1 (S207).

A first query executor 106 of the corresponding sensor node 102 of the sensor network A 100 executes the comparison predicate P1 by using a first spatial index 104 for a sensor node subset (i.e., a set of sensor nodes included in the first candidate node pair), and transmits a result [A.R] of the execution to the query execution unit 220 (S208).

The query execution unit 220 receives the result [A.R] that is given from the sensor nodes of the first candidate node pair of the network A 100, and extracts a second candidate node pair by re-executing the spatial join predicate S on the result [A.R] and a sensor node subset (i.e., a set of sensor nodes included in the first candidate node pair) of the sensor network B 110 (S209).

In addition, as in the sensor network A 100, the query execution unit 220 acquires a result [B.R] by executing the comparison predicate P2 on the sensor nodes of the sensor network B 110, that are included in the second candidate node pair (S210).

The query execution unit 220 stores selectivity information on the result [A.R] of the comparison predicate P1 and the result [B.R] of the comparison predicate P2 in the query result storage unit 240, and transmits a result of the final sensor nodes to the application service unit 300 (S211).

The sensor node managing method according to the exemplary embodiment of the present invention describes only the two different sensor networks A and B, and the above-stated query and response process can be applied to the case that a plurality of different sensor networks are connected to each other. However, when a plurality of spatial join predicates (Sk, k is a natural number) are given, it is more efficient in the entire filtering process to execute all the spatial join predicates Sk first and then sequentially execute the sensor node managing method from one that results in the smallest number of candidate node pairs. Although it may be a load for the sensor node managing apparatus to perform the entire spatial join predicates Sk in advance, it does not cause the sensor nodes to consume excessive power. Furthermore, the results of the spatial join predicates Sk can be used for the next same query by executing the entire spatial join predicates Sk only once, and therefore this may not be an excessive load for the sensor node managing apparatus.

The sensor node managing method according to the exemplary embodiment of the present invention has an advantage of precisely searching for a sensor node while minimizing the amount of power consumption of all sensor nodes (i.e., sensor nodes in different sensor networks) if a user defines various predicates in the heterogeneous sensor networks.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A sensor node managing apparatus that transmits/receives data through connection with more than two different sensor networks, each of which includes a plurality of sensor nodes, the sensor node managing apparatus comprising:
   a query optimization unit receiving a query that includes a spatial join predicate for searching for target sensor nodes and a comparison predicate that is different for each sensor network, and
   generating query execution order for searching for the target sensor nodes based on the received query, wherein the spatial join predicate is related to a spatial location between the sensor nodes respectively included in different sensor networks, and wherein the comparison predicate is related to sensing values of the sensor nodes from the respective sensor networks;
   a query execution unit executing the spatial join predicate and the comparison predicate on the more than two different sensor networks based on the query execution order received from the query optimization unit, and extracting the target sensor nodes by using a result of the execution,
   a spatial index unit storing location information of the sensor nodes respectively included in the more than two sensor networks, wherein the query execution unit extracts sensor nodes that correspond to the spatial join predicate based on the location information stored in the spatial index unit, and
   a query result storage unit storing selectivity information that includes sensor node extraction information of each sensor node network with respect to previous execution results of a previous spatial join predicate and a previous comparison predicate, which have been previously executed,
   wherein, when selectivity information on the previous spatial join predicate and the previous comparison predicate is stored in the query result storage unit, the query optimization unit generates the query execution order based on the selectivity information stored in the query result storage unit.

2. The sensor node managing apparatus of claim 1, wherein the query optimization unit generates the query execution order for the comparison predicates to be executed on the more than two sensor networks based on the selectivity information of the previous spatial join predicate and the previous comparison operation predicate, after performing the spatial join predicate.

3. The sensor node managing apparatus of claim 2, wherein the target sensor node is at least more than two sensor nodes, each of which is included in a different sensor network.

4. A sensor node managing method for managing more than two different sensor networks, each including a plurality of sensor nodes, the sensor node managing method comprising:

receiving a query that includes a spatial join predicate for searching target sensor nodes and a comparison predicate that is different for each sensor network, wherein the spatial join predicate is related to a spatial location between the sensor nodes, each included in a different sensor network, and wherein the comparison predicate is related to sensing values of the sensor nodes in each sensor network;

determining query execution order for searching target sensor nodes respectively included in the more than two different sensor networks on the basis of the spatial join predicate and the comparison predicate;

executing a query of the spatial join predicate and the comparison predicate for the plurality of sensor nodes on the basis of the determined query execution order; and extracting the target sensor nodes as a query result of the executing of the query, wherein the determining of the query execution order comprises:

determining whether selectivity information corresponding to the spatial join predicate and the comparison predicate is included in previous selectivity information of sensor nodes selected by a previous spatial join predicate and a previous comparison predicate that have been previously stored; and determining query execution order for searching for target sensor nodes of the more than two different sensor networks on the basis of the corresponding selectivity information if the corresponding selectivity information exists.

5. The sensor node managing method of claim 4, further comprising randomly determining query execution order for the comparison predicate if the corresponding selectivity information does not exist.

6. The sensor node managing method of claim 4, wherein the executing of the query comprises:

extracting first candidate nodes of the spatial join predicate from among the plurality of sensor nodes based on stored location information of the plurality of sensor nodes;

executing a first comparison predicate on sensor nodes included in the first candidate nodes from among sensor nodes of a first sensor network based on the query execution order;

extracting second candidate nodes by executing the spatial join predicate on sensor nodes of a second sensor network, which correspond to the sensor nodes of the first sensor network, which have been selected by the first comparison predicate from the first candidate nodes; and executing a second comparison predicate on the sensor nodes of the second sensor network among the second candidate nodes.

7. The sensor node managing method of claim 6, further comprising, after the extracting of the target sensor nodes, storing first selectivity information on an extraction ratio of the target sensor node for each of the more than two different sensor networks.

* * * * *